United States Patent
Bruckert et al.

[11] Patent Number: 5,956,641
[45] Date of Patent: Sep. 21, 1999

[54] SYSTEM AND METHOD FOR FACILITATING A HANDOFF OF AT LEAST ONE MOBILE UNIT IN A TELECOMMUNICATION SYSTEM

[75] Inventors: Eugene J. Bruckert, Arlington Heights; Michael D. Kotzin, Buffalo Grove, both of Ill.

[73] Assignee: Motorola, Inc., Schaumburg, Ill.

[21] Appl. No.: 09/050,632

[22] Filed: Mar. 30, 1998

[51] Int. Cl.[6] ............................................. H04Q 7/38
[52] U.S. Cl. ....................... 455/442; 455/436; 455/439
[58] Field of Search ............................. 455/432, 436, 455/437, 439, 442, 443, 447, 448, 450, 454, 82, 502, 561, 562; 375/208, 206, 200, 367; 370/342, 335, 320, 441, 479, 331, 203

[56] References Cited

U.S. PATENT DOCUMENTS

| | | | |
|---|---|---|---|
| 5,377,183 | 12/1994 | Dent | 455/524 |
| 5,416,797 | 5/1995 | Gilhousen et al. | 455/422 |
| 5,432,843 | 7/1995 | Bonta | 455/437 |
| 5,590,177 | 12/1996 | Vilmur et al. | 455/436 |
| 5,594,718 | 1/1997 | Weaver, Jr. et al. | . |
| 5,649,000 | 7/1997 | Lee et al. | 455/436 |
| 5,680,395 | 10/1997 | Weaver, Jr. et al. | . |
| 5,784,695 | 7/1998 | Upton et al. | 455/436 |
| 5,859,840 | 1/1999 | Tiedemann, Jr. et al. | 370/441 |

FOREIGN PATENT DOCUMENTS

WO96/02117   1/1996   WIPO .

*Primary Examiner*—Dwayne D. Bost
*Assistant Examiner*—Jean A. Gelin
*Attorney, Agent, or Firm*—Kenneth A. Haas

[57] ABSTRACT

A method and system for facilitating a handoff of a remote mobile unit in a communication system 12 having a plurality of base stations (16 and 22), employs base stations (16 and 22) along a coverage area seam (10) that have a soft handoff subsystem (24) collocated with conventional base station circuitry (44) to facilitate soft handoff. The soft handoff subsystem (24) includes a transceiver (36) for generating and receiving a first group of dedicated soft handoff channels that are an orthogonally related subset of a separate second group of spread spectrum coded traffic channels wherein the soft handoff subsystem is under control of the source base station controller (14). The dedicated soft handoff channels are assigned to a specified source base station (16). Preferably the soft handoff subsystem (24) generates only the first group of dedicated soft handoff channels without pilot channels or synchronization channels.

19 Claims, 5 Drawing Sheets

SYSTEM AND METHOD FOR FACILITATING A HANDOFF OF AT LEAST ONE MOBILE UNIT IN A TELECOMMUNICATION SYSTEM

FIELD OF THE INVENTION

The invention relates generally to methods and systems for providing handoffs in telecommunication systems, such as cellular communication systems, and more particularly to methods and systems for facilitating a handoff of a mobile subscriber unit in a communication system employing spread spectrum coding.

BACKGROUND OF THE INVENTION

In telecommunication systems, such as cellular communication systems or other radio frequency based communication systems, a mobile subscriber unit must be handed off from a source coverage area to a neighboring coverage area to allow continuous communication for the mobile subscriber unit as it travels across boundaries of coverage areas in a coverage system. There are several types of known handoff arrangements. A hard handoff typically involves communication between the mobile subscriber unit and two base stations such that the mobile subscriber unit only communicates with one base station at a time. A soft handoff typically involves communication by the mobile subscriber unit with multiple base stations at the same time.

Generally, during a soft handoff a source base station communicates with the mobile subscriber unit while the mobile subscriber unit also communicates with a target base station. In code division multiple access (CDMA) telecommunication systems, during a soft handoff, the mobile subscriber unit communicates with the source base station and target base station over a same frequency band. Each base station transmits the same information but spread with independent spreading sequences and receives the mobile subscriber unit transmission for later selection combining at a common point, e.g., the base station controller. However, there are times when it is difficult to set up a soft handoff, for example, when the base stations are controlled by two different and possibly geographically separated base station controllers that may even be connected to different mobile switching centers. The handoff region between base stations controlled by different base station controllers is called a coverage seam. A method for hard handoff across coverage seams is described, for example, in U.S. Pat. No. 5,682,416 assigned to the instant assignee.

A proposed handoff method and system such as that described in international patent application No. PCT/FI95/00389 published Jan. 25, 1996 having an inventor Petri Jolma, discloses neighboring cells along a coverage seam wherein the target cell is served by two independent collocated base stations that are controlled by base station controllers associated with neighboring coverage areas. The operations of the two base stations are independent of each other but their coverage areas and propagation conditions are designed to be substantially identical in an attempt to reduce their mutual interference. In addition, both collocated base stations operate in the same frequency range but employ different spreading codes for their respective channels. The equipment of the two base stations may be implemented by dividing a physical base station into two logical separate sections but which employ the same antenna. Hence the base stations employ the same physical resources (e.g., equipment cabinets, antenna towers and antennas) but the equipment has separate connections for two base station controllers. As a mobile subscriber unit moves across the seam, a source base station carries out a soft handoff to a traffic channel of a base station under the control of the same base station controller. As the mobile subscriber unit continues to move toward the target base station, a hard handoff is performed to switch control from one base station controller to a base station controller controlling the target base station. In such a hard handoff, the spreading code employed by the mobile subscriber unit changes.

Several problems can occur in such a system that utilizes collocated independent base stations to effect a soft handoff across coverage seams. For example with two independent base stations in the same equipment box, each base station typically transmits its own pilot channels for use in providing timing and phase synchronization to aide in subsequent demodulation of a transmitted signal on a traffic channel, as known in the art. Having multiple independent base stations with dual pilot generation, can cause unnecessary interference during handoffs. In addition, where such systems use different spreading codes, from two base stations that are independent of each other, additional noise may be added during handoff operation.

In addition, such a system may not provide adequate integration of its existing hardware and therefore may be more costly. Also, such a system may not provide suitable synchronization between a target base station and the collocated base station. For example, where two independent but collocated base stations transmit from the same antenna, the timing of traffic channels for a handoff may be different, resulting in an inaccurate time alignment and frequency alignment of the soft handoff channels. Also, all the transmitted power of the target base station acts as a noise source to the portion of the mobile subscriber unit receiver trying to demodulate the signal from the collocated base station.

Moreover, it would be desirable to have a soft handoff system that could be implemented regardless of manufacturer differences in base station design. The intermixing of base station equipment of multiple vendors while facilitating soft handoff can improve communication quality and reliability.

Consequently there exists a need for a method and system for facilitating a handoff of a mobile subscriber unit in a telecommunication system having a plurality of base stations that provide code division multiple access communication.

DETAILED DESCRIPTION OF THE PREFERRED EMBODIMENT

A method and system for facilitating a handoff of a remote mobile subscriber unit from a source base station to a target base station in a communication system having a plurality of base stations, such as in a code division multiple access communication system, employs target base stations along a coverage area seam that have a soft handoff subsystem collocated with conventional base station circuitry to facilitate soft handoff. The soft handoff subsystem includes a transceiver for generating and receiving a first group of dedicated soft handoff channels that are an orthogonally related subset of a separate second group of spread spectrum coded traffic channels wherein the soft handoff subsystem is under control of the source base station controller. The dedicated soft handoff channels are assigned to a specified source base station controller. Preferably the soft handoff subsystem generates only the first group of dedicated soft handoff channels without pilot channels or synchronization channels.

The soft handoff subsystem includes a synchronizing circuit to facilitate at least time synchronization of the dedicated soft handoff channels with the second group of spread spectrum coded traffic channels. The soft handoff subsystem includes a controller which sends and receives information through a controller at the source base station to communicate synchronization data such as pilot channel arrival time data from a pilot channel receiver that receives pilot channel information from the conventional base station system. The conventional base station system generates the second group of spread spectrum traffic channels over a collocated antenna system and the second group of spread spectrum channels are orthogonally related to the first group of dedicated soft handoff channels so that the dedicated soft handoff channels are not completely different from the conventional traffic channels of the second group. For example, the dedicated soft handoff channels could be a subset of the traffic channels normally assigned to a base station.

A source base station located along the seam, includes a controller for generating dedicated soft handoff traffic control data for use by the target base station to facilitate selection of the desired dedicated soft handoff channel generated from the soft handoff subsystem transceiver. Hence the source base station controls the selection of the soft handoff channel generated from the target base station site. Once a soft handoff is no longer needed, a hard handoff is made under control of the base station controllers wherein a hard handoff traffic channel is generated by maintaining a constant scrambling code and synchronizing a change in spreading code for the traffic channel.

Figure 1:
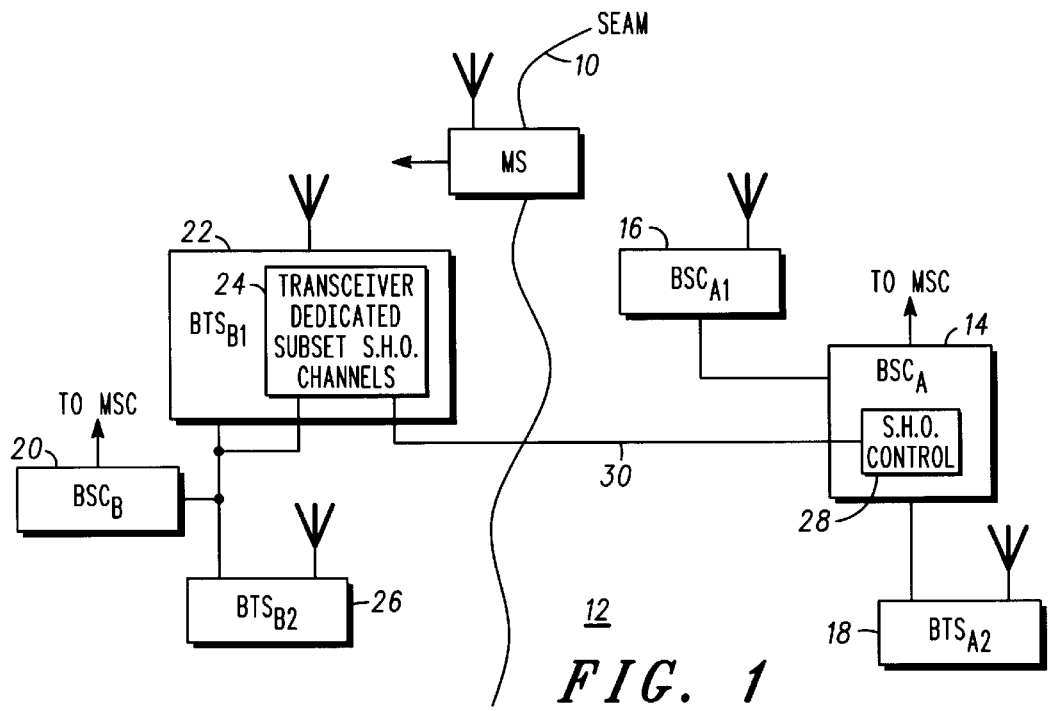
FIG. 1 is a block diagram generally illustrating a plurality of base stations along a coverage seam having dedicated soft handoff channel subsystems in accordance with the invention.

FIG. 1 shows a coverage seam 10 in a telecommunication system such as a cellular code division multiple access communication system 12. However it will be recognized that the disclosed system may be applicable to other telecommunication systems, including for example personal communication systems (PCS) and non cellular communication systems. The CDMA telecommunication system 12 includes a base station controller ($BSC_A$) 14 controlling a base station 16 located along one side of a coverage seam 10 and also controlling another base station 18 located along the same side of the coverage seam 10. In addition, a second base station controller 20 controls a target base station 22 located along the other side of the coverage seam 10 and containing a soft handoff subsystem 24 that has dedicated soft handoff channels. The base station controller 20 may also control other base stations 26 which are not along the coverage seam 10. Both of the base station controllers 14 and 20 are connected to a mobile switching center (MSC) as known in the art.

The target base station 22 includes conventional base station circuits such as transceivers for facilitating spread spectrum channel coding, and other conventional systems for receiving and transmitting pilot channels, synchronization channels and other traffic channels such as those set forth in standard IS-95A, incorporated herein by reference. The base station controller 14 is connected to both the source base station 16 and the target base station 22 through a land line connection 30 such as a T1 connection. More particularly, the base station controller 14 includes a soft handoff controller 28 which communicates with the soft handoff subsystem 24.

The source base station controller 14 and the target base station controller 20 (FIG. 1) communicate with each other through the mobile switching center (MSC). The MSC conveys information to be used by the soft handoff subsystem 24 such as pseudo noise (PN) offset changes, traffic channel numbers allowed for use by the soft handoff subsystem, maximum linear power amplifier transmit power allowed, and other conventional information. Such configuration parameters are usually set by a radio operations and maintenance center subsystem as known in the art.

Figure 2:
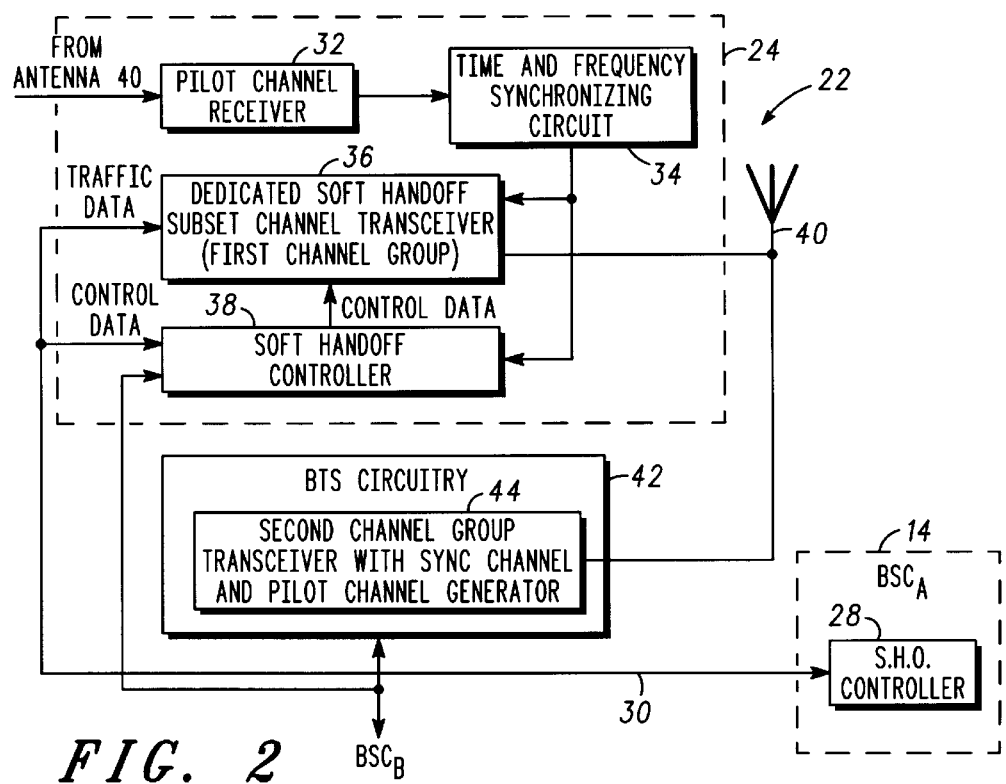
FIG. 2 is a block diagram depicting one embodiment of a soft handoff subsystem in a base station along a coverage seam in accordance with one embodiment of the invention.

FIG. 2 shows the soft handoff subsystem 24 having a pilot channel receiver 32, a time and frequency synchronizing circuit 34, a dedicated soft handoff subset channel transceiver 36 and a first soft handoff controller 38. The soft handoff subsystem 24 is connected to an antenna system 40 along with collocated conventional base station circuitry 42 which includes a second channel group transceiver 44 which generates and receives a second group of spread spectrum traffic channels that are orthogonally related to the dedicated soft handoff channels generated and received by transceiver 36.

The dedicated soft handoff subset channel transceiver 36 generates and receives a first group of dedicated soft handoff channels that are an orthogonally related subset of the second group of spread spectrum coded traffic channels that are generated and received by second channel group transceiver 44. The dedicated soft handoff subset channel transceiver 36 communicates with the source base station controller 14 via communication link 30 to the second handoff controller 28. Preferably the dedicated soft handoff subset channel transceiver 36 transmits dedicated soft handoff channels which are traffic channels reserved for exclusive use to support soft handoff with the source base station. The dedicated soft handoff transceiver does not generate a pilot channel, a page channel(s) or a synchronization control channel. In addition, the dedicated soft handoff subset channel transceiver 36 has the same timing (e.g., within a small fraction of an RF symbol—on the order of 40 nanoseconds) and pseudo noise (PN) scrambling offset as the target base station second channel group and transmits from the same antenna system 40 as the standard traffic channels from the second channel group transceiver 44.

The time and frequency synchronizing circuit 34 synchronizes a dedicated soft handoff subset traffic channel time and frequency for the target base station based on pilot channel and synchronization channel data from the second group of spread spectrum traffic channels through pilot channel receiver 32. This facilitates a soft handoff channel set for the dedicated soft handoff subset channels that is time and frequency coherent with the target base station. Hence the dedicated soft handoff subset channels appear for all practical purposes to be generated by the target base station. In operation, the second channel group transceiver 44 generates a pilot channel and synchronization channel along with other traffic channels as known in the art through antenna system 40. These signals are coupled to the pilot channel receiver 32 and passed to the time and frequency synchronizing circuit 34 to obtain time alignment and frequency alignment signals for use by the dedicated soft handoff subset channel transceiver 36 so that the dedicated soft handoff channels are transmitted at a same time and frequency as traffic channels generated by the second channel group transceiver 44.

A first soft handoff controller 38 in the target base station 22 also receives time synchronizing signals from the time and frequency synchronizing circuit 34, such as pilot channel arrival time data, and communicates this synchronization information to the second soft handoff controller 28. In addition, the first soft handoff controller 38 communicates channel power information to be used by the source base site controller 14. The pilot channel arrival time data is used by the source base site controller to time align the same soft handoff channel through the source base station 16.

The source base station controller 14 through second soft handoff controller 28 generates dedicated soft handoff traffic channel control data for use by the target base station 22 to facilitate selection of a desired dedicated soft handoff channel. Therefore, when a soft handoff is to occur, the source base site controller 14 selects one of the dedicated subset soft handoff channels for use during the soft handoff transaction and communicates this information to the first soft handoff controller 38 and to the dedicated soft handoff subset channel transceiver 36. The dedicated soft handoff subset channel transceiver 36 then generates the selected dedicated soft handoff channel using the antenna system 40.

Figure 3:
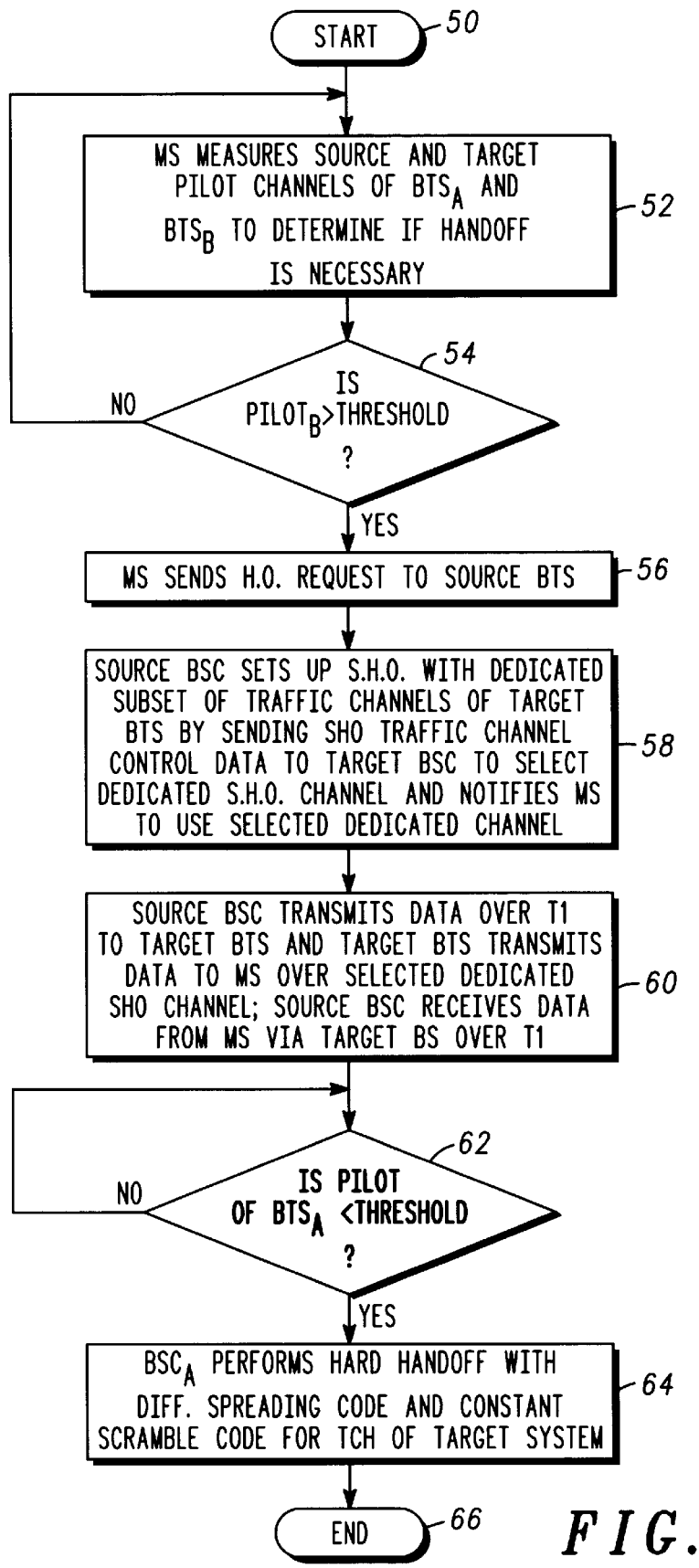
FIG. 3 is a flow chart generally illustrating the operation of a mobile unit within a handoff system employing the soft handoff subsystem with dedicated soft handoff channel implementation in accordance with one embodiment of the invention.

Referring to FIG. 3, an example of system operation will be explained. As shown in block 50, upon system initialization or at another suitable time, the subset of dedicated soft handoff channels are assigned to a target base station and a corresponding source base station controller. The remaining channels are the second set of channels which are conventional orthogonally related traffic channels. The dedicated traffic channels are for the exclusive use of the collocated soft handoff subsystem and are assigned via a link (not shown) between $BSC_A$ 14 and $BSC_B$ 20 preferably via the MSCs supporting $BSC_A$ 14 and $BSC_B$. 20. Alternatively, a direct link can be set up between $BSC_A$ 14 and $BSC_B$ 20. After initialization, the mobile subscriber unit measures a current traffic channel as transmitted by the source base station and also measures a current target pilot channel from the target base station as well as the source pilot channel from the source base station to determine if a handoff is necessary. This is shown in block 52. If the measured pilot channel from the target base station is above a predetermined threshold, the mobile subscriber unit sends a handoff request to the source base station as shown in blocks 54 and 56. If the pilot channel from the source base station is not above the predetermined threshold, the mobile subscriber unit continues to treat the source base station as the serving base station and continues to measure a target pilot channel power from the target base station and compares the pilot channel power of the source station.

Upon receiving the handoff request from the mobile subscriber unit, the source base station 16 communicates the request information to the source base station controller 14 which then sets up the soft handoff transaction as shown in block 58. During the soft handoff set up process, the source base station controller 14 generates dedicated soft handoff traffic control channel data for use by the target base station 22 to facilitate selection of the desired dedicated soft handoff channel that has been assigned to the source base station controller 14. The soft handoff traffic channel control data includes data representing which of the dedicated soft handoff subset channels are to be used for the current soft handoff transaction. This traffic channel control data is sent to the soft handoff subsystem of the target base station over communication link 30, as is shown in block 60. The soft handoff subsystem 24 then transmits data to the mobile subscriber unit over the selected dedicated soft handoff channel using the dedicated soft handoff subset channel transceiver 36. The source $BSC_A$ 14 receives decoded traffic channel data frames from the mobile subscriber unit via the target base station 22 over communication link 30. In addition, the source $BSC_A$ 14 receives decoded traffic channel data frames from the mobile subscriber unit through the source base station 16.

As shown in block 62, the mobile subscriber unit continues to evaluate the pilot channel transmitted by the second channel group transceiver 44 of the target base station with the pilot channel received from the source base station to determine if the pilot of the source base station is less than a predetermined threshold. If the pilot signal from the source base station has dropped below a predetermined threshold, indicating that the signal from the source base station is no longer suitable for continued communication, the mobile subscriber unit communicates a request for a hard handoff as known in the art. The source base station 16 communicates this information to the source base controller 14 which then performs a hard handoff, as shown in block 64, by notifying the serving base station controller through the MSC that a hard handoff is to occur.

The target base station then generates a traffic channel for a hard handoff using the second channel group transceiver 44 by maintaining a constant scrambling code, for example using a constant PN offset, and synchronizing a change in spread spectrum coding, such as a change in Walsh coding, for use as the hard handoff traffic channel. As shown in block 66 once a hard handoff occurs, the system then waits for additional commands from another mobile subscriber unit or the same mobile subscriber unit requesting a soft handoff.

An alternative embodiment for executing a hard handoff is to pass control of the dedicated soft handoff traffic channel to base station controller 20, begin transmitting the soft handoff traffic channel from the second channel group transceiver 44 and discontinue transmitting from the source base station 16 and dedicated soft handoff transceiver 36. The timing of this transfer and reorganization of the dedicated soft handoff subset is accomplished by coordinating base station controllers 14 and 20.

Figure 4:
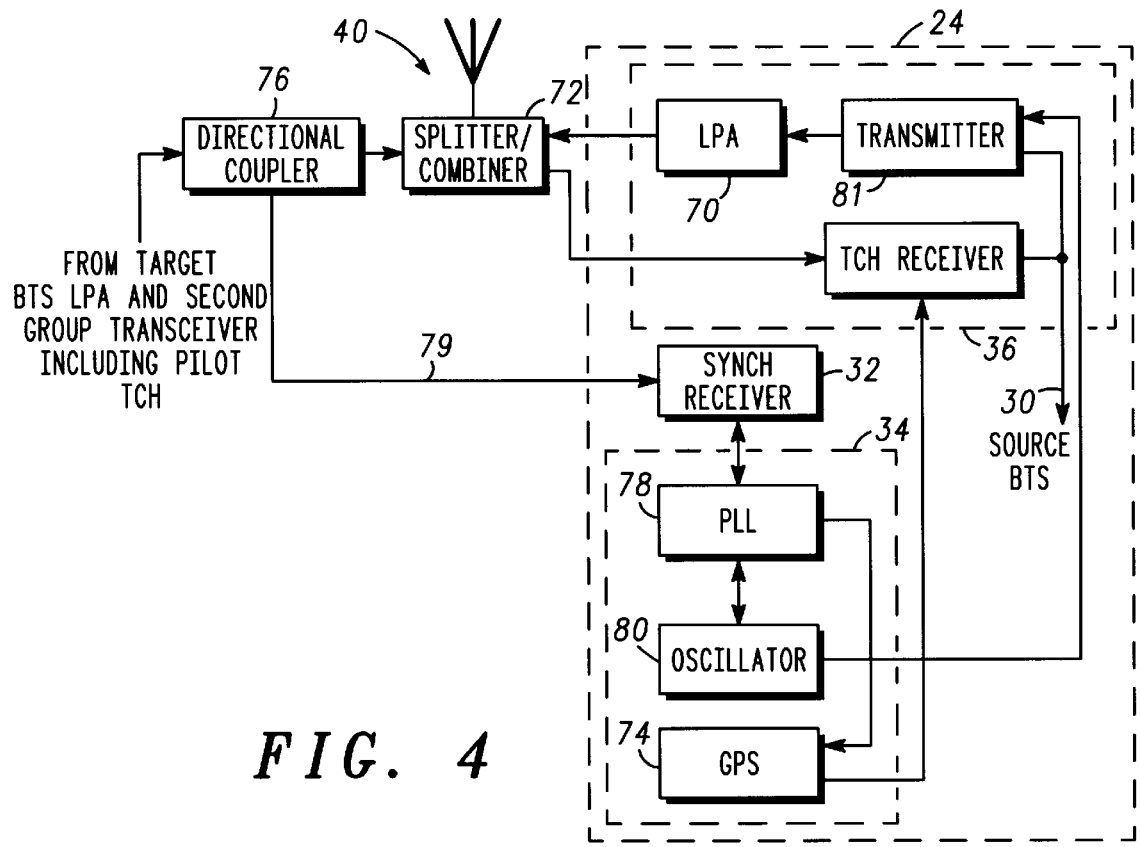
FIG. 4 is a block diagram illustrating an implementation of the soft handoff subsystem in a base station in accordance with one embodiment of the invention.

FIG. 4 shows a block diagram of a dedicated soft handoff subsystem 24 base station interfaced with portions of a standard base station. Such a configuration may be suitable for use in connecting with base stations of differing manufacturers. In this configuration, the soft handoff subsystem 24 has its own linear power amplifier 70 that is connected to the common transmit antenna system 40 through an available combiner 72. The soft handoff subsystem 24 derives its time and frequency synchronization from a global positioning system receiver 74 which may be any suitable global positioning system receiver as known in the art. The dedicated soft handoff subsystem 24 base station equipment obtains its time and frequency synchronization via a directional coupler 76, synchronizing receiver 32 and phase lock loop 78. The RF signal or traffic channel from the second group transceiver is sampled by the directional coupler 76 and demodulated by the synchronizing receiver 32 which provides a frequency and phase reference to a high stability oscillator 80 of the soft handoff subsystem.

The oscillator 80 is locked in phase with an intermediate frequency of the synchronizing receiver 32. A second function of the synchronizing receiver 32 is to provide a time reference form the phased locked loop (PLL) 78 so that the GPS receiver 74 may be adjusted to coincide with the timing of the target base station. The PLL 78 locks the frequency of the oscillator 80 to the carrier frequency from signal 79 to obtain modulation timing for the soft handoff channel transceiver 36. A timing advance/retard should be made to account for delays in the soft handoff subsystem 24 circuits. The directional coupler 76 may be located either before or after the combiner 72. In either case, the synchronizing receiver 32 should phase lock the demodulated waveforms 79 of the traffic channels and/or pilot channel from the second group transceiver and the dedicated soft handoff channels to estimate the timing advance required. In addition, the synchronizing receiver 32 is also configured to provide the PN offset information so that any changes may be quickly found. The oscillator 80 provides modulation time to a soft handoff transmitter 81 so that the soft handoff channels are frequency coherent with the second group of channels. The transmitter 81 applies spread spectrum coding and applies scramble coding as known in the art to the first group of dedicated soft handoff channels.

Figure 5:
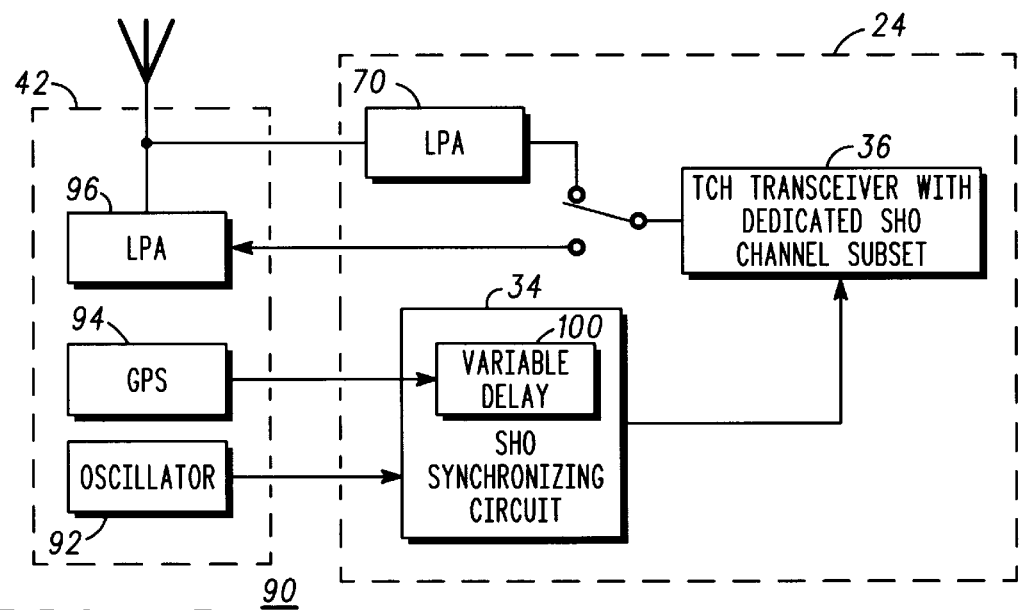
FIG. 5 is a schematic block diagram generally depicting a base station employing soft handoff traffic channel generation in accordance with an alternative embodiment of the invention.

FIG. 5 shows an alternative collocated base station arrangement 90 which may be applied when a standard base station and a soft handoff subsystem are more closely coordinated, e.g., from the same manufacturer. The frequency standard based on oscillator 92, the time standard (the global positioning system standard) based on GPS 94 and the linear power amplifier (LPA) 96 may be shared between the conventional base station circuitry 42 that generates the second group of traffic channels and the additional soft handoff subsystem 24 circuits. A separate time adjustment is required for the collocated soft handoff subsystem 24 to account for the unique delays in its circuitry. As shown, the soft handoff subsystem 24 utilizes its own linear power amplifier 70 but as previously mentioned, may use the same linear power amplifier 96 as the conventional BTS circuitry 42. As shown, a global positioning system circuit 94 in the conventional base station circuit serves as an input that is delayed/advanced by variable delay 100 to compensate for the delays in the synchronizing circuit 34. The oscillator 92 is used to derive a coherent frequency standard for LPA 70.

Figure 6:
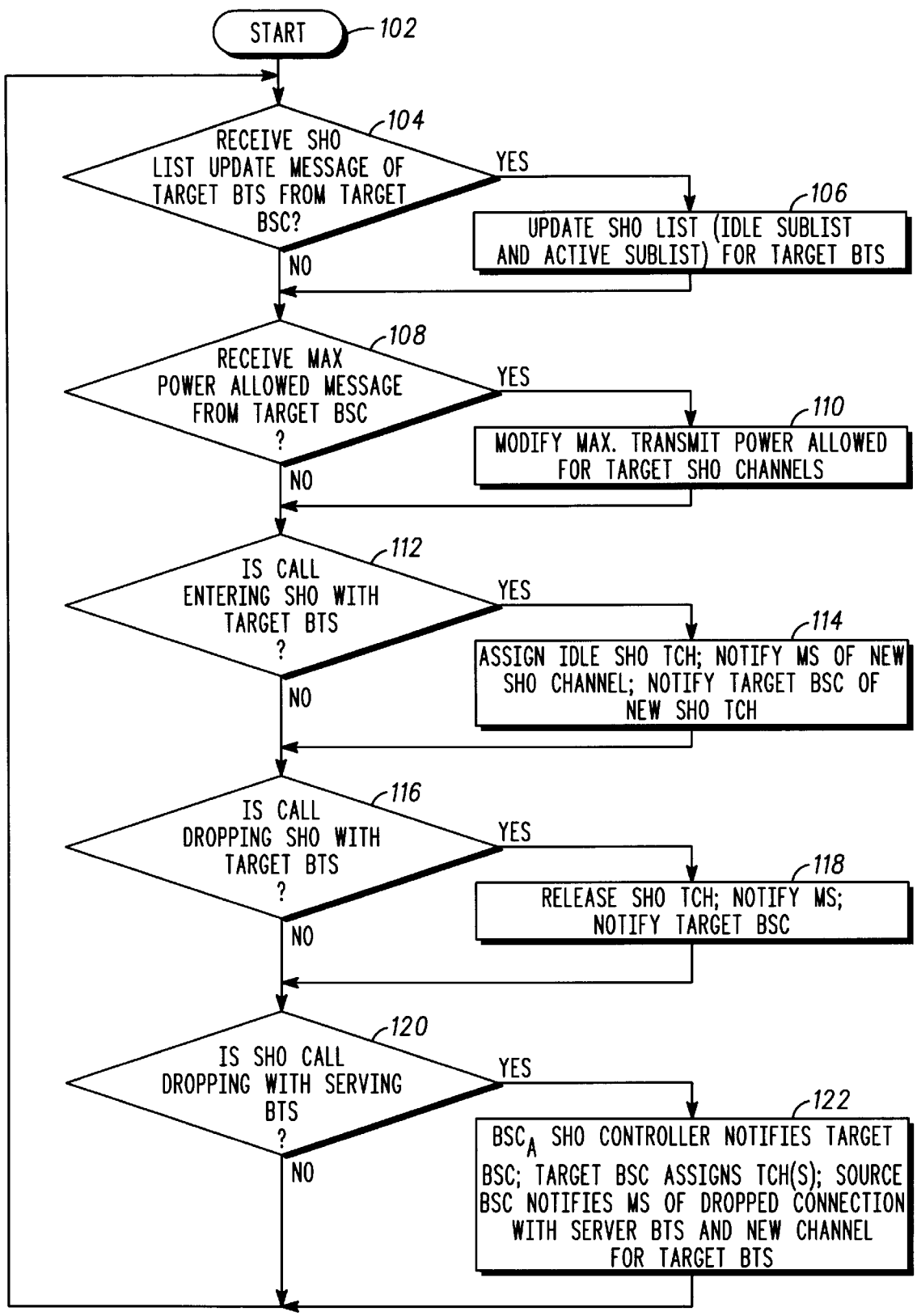
FIG. 6 is a flow chart illustrating operation of source and target base station with soft handoff controllers in accordance with one embodiment of the invention.

FIG. 6 is a flow chart illustrating an example of the operation of the soft handoff controllers 28 and 38 (FIG. 2) during a soft handoff condition. The operation starts in block 102 where a dedicated soft handoff channel list request is sent from the source controller 28 to the target controller 38 (FIG. 2). The source controller 28 checks to see if the soft handoff list update message has been received from the target controller 38 as shown in block 104. If the update message has been received, the source controller 28 updates its soft handoff list for the given target base station that sent the message, as shown in block 106. The list includes a list of idle dedicated soft handoff channels and a list of active (in use) dedicated soft handoff channels. As shown by block 108, if no additional update message is received or if the list has been updated, the source controller 28 waits to receive the maximum power level message from the target controller 38 indicating the power setting for the soft hand off channel. When such a message is received, the source controller 28 modifies the maximum transmit power allowed for the target soft handoff channels (or on a per channel basis) to be consistent with the maximum power level message, as shown in block 110. In block 112, the source base station determines if the call with the mobile subscriber unit is entering a soft handoff condition with the target base station. If a soft handoff is going to occur, the source controller 28 assigns an idle soft handoff traffic channel from the idle list and notifies the mobile subscriber of the new soft handoff channel. In addition, the source controller 28 notifies the target base station controller of the new soft handoff channel. This is shown in block 114. The source base station then waits to see if the call has been dropped from the soft handoff channel with the target base station shown in block 116. If the call is being dropped, the source controller 28 releases the soft handoff channel and notifies the mobile subscriber unit. In addition, the source controller 28 notifies the target base station controller that the soft handoff channel has been released, as shown in block 118. If the call is not being dropped at the target base station, or if it has been dropped and the channel has been released, the source controller 28 determines if the call is being dropped from the serving or source base station, as shown in block 120. If the call is being dropped with the serving base station, the source soft handoff controller 28 notifies the target base station controller. The target base station controller sends a new traffic channel to soft handoff controller 28 and the soft handoff controller 28 notifies mobile subscriber of the drop connection with the server base station and notifies the subscriber of the new channel for the target base station. This is shown in block 122. The new traffic channel could be the soft handoff channel such that the soft handoff channel becomes a member of the second group of channels. Another channel should then be assigned as a dedicated soft handoff channel.

If the dedicated soft handoff subset has run out of channels, the second soft handoff controller 28 may prematurely terminate the traffic on a selected dedicated soft handoff traffic and assign it to a mobile subscriber unit waiting for a soft handoff channel. Also, the second soft handoff controller 28 controls the size of the dedicated soft handoff subset through negotiations with $BSC_B$ 20.

Figure 7:
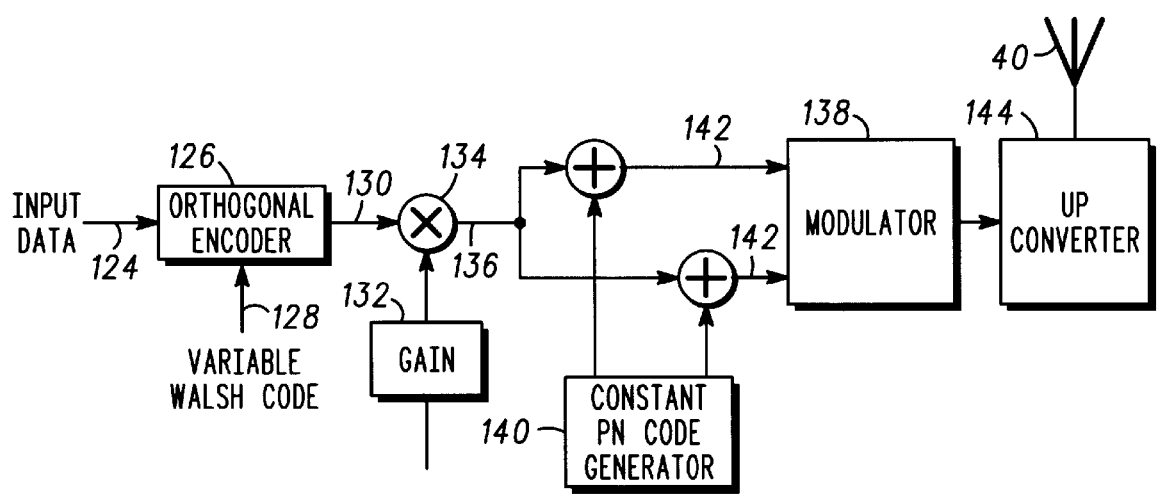
FIG. 7 is a block diagram of one embodiment of hard handoff circuitry utilized by a second group channel transceiver in accordance with one embodiment of the invention.

FIG. 7 shows a block diagram of hard handoff circuitry utilized by the second group channel transceiver 44 to generate a hard handoff traffic channel. Input data 124 to be transmitted on the traffic channels is passed to an orthogonal encoder 126 which applies variable Walsh codes 128 as known in the art to the input data 124. The orthogonal encoding produces a suitable spreading code of spread data 130 which is then modified by a gain block 132 if desired to provide weighting of coding, such as power gain based on a speed of the mobile subscriber unit. The output is then sent to multiplier 134 which multiplies Walsh code spread data 130 by a gain value resulting in a sequence of weighted Walsh codes 136. The sequence of weighted Walsh codes 136 is prepared for transmission over a communication channel by modulator 138. The spreading code is a user specific sequence of symbols or unique user code which is output at a fixed chip rate (e.g., 3.6864 megachips per second). In addition, the user code spreading coded chips are scrambled by a pair of short pseudo random (PN) codes to generate an I channel and Q channel code spread sequence 142. The pseudo random codes are constant and generated by a constant pseudo random code generator 140 while the Walsh codes are variable. The modulated signals are then up converted and eventually transmitted through up converter 144 as known in the art.

As seen from the above description, the same antenna system is used to transmit both dedicated soft handoff traffic channels and orthogonally related standard traffic channels including pilot and synchronization channels to help ensure that the dedicated soft handoff channels have the same quality as a subsequently used traffic channel used after hard handoff. The system uses a pilot of the target base station as a time reference for the dedicated soft handoff channels. In addition, the soft handoffs are a subject of target traffic channels dedicated for soft handoff and are assigned to a specific source base station control system.

It will be recognized that a soft handoff subsystem should suitably be employed in neighboring base stations along a seam so that when a mobile subscriber unit travels in either direction, a similar soft handoff control is accomplished. Moreover, a base station along a same side of a seam may wish to facilitate a soft handoff with another base station on the same side of the seam. It should therefore be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for facilitating a handoff of at least one mobile unit in a telecommunication system having a plurality of base stations providing code division multiple access (CDMA) communication, comprising the steps of:
   generating over an antenna system, by a target base station, a first group of dedicated soft handoff channels being an orthogonally related subset of a separate second group of spread spectrum coded traffic channels wherein the first group of dedicated soft handoff channels are under control of a specified source base station; and
   generating, by the target base station, the second group of spread spectrum traffic channels over a collocated antenna system wherein the second group of spread spectrum traffic channels are orthogonally related to the first group of dedicated soft handoff channels.

2. The method of claim 1 including generating dedicated soft handoff traffic channel control data for use by the target base station from a control source other than the target base station, to facilitate selection of a desired dedicated soft handoff channel generated by the target base station.

3. The method of claim 1 including the steps of:
   generating as part of the second group of spread spectrum traffic channels, a pilot channel; and
   synchronizing a traffic channel time and frequency for the target base station based on the pilot channel of the second group of spread spectrum traffic channels to facilitate a soft handoff channel set for the first group of spread spectrum traffic channels that is time and frequency coherent with the target base station.

4. The method of claim 3 wherein the step of generating the first group of dedicated soft handoff channels includes only generating the first group of dedicated soft handoff channels without an additional pilot channel.

5. The method of claim 1 including applying spread spectrum coding and applying scramble coding to generate at least one channel in the first group of dedicated soft handoff channels.

6. The method of claim 5 including the step of generating a traffic channel for a hard handoff by maintaining a constant scrambling code and synchronizing a change in spread spectrum coding.

7. The method of claim 2 including receiving the dedicated soft handoff traffic control data by the target base station and sending, in response to the traffic control data, channel arrival time data for use by the source base station to facilitate at least time synchronization of the dedicated soft handoff channel with a corresponding dedicated soft handoff traffic channel used by the source base station.

8. A system for facilitating a handoff of at least one mobile unit in a telecommunication system having a plurality of base stations providing code division multiple access (CDMA) communication, comprising:
   a first transceiver, associated with a target base station, that generates over an antenna system a first group of dedicated soft handoff channels being an orthogonally related subset of a separate second group of spread spectrum coded traffic channels wherein the first group of dedicated soft handoff channels are under control of a specified source base station; and
   a second transceiver collocated with the first transceiver, that generates the second group of spread spectrum traffic channels over a collocated antenna system wherein the second group of spread spectrum traffic channels are orthogonally related to the first group of dedicated soft handoff channels.

9. The system of claim 8 including a controller, operatively coupled to the first transceiver and associated with the source base station, that generates dedicated soft handoff traffic channel control data for the first transceiver to facilitate selection of a desired dedicated soft handoff channel generated by the target base station.

10. The system of claim 8 wherein the second transceiver generates as part of the second group of spread spectrum traffic channels, a pilot channel and synchronization channel; and wherein the target base station includes synchronization circuitry to synchronize a traffic channel time and frequency for the target base station based on the pilot channel and synchronization channel in the second group of spread spectrum traffic channels to facilitate a soft handoff channel set that is time and frequency coherent with the target base station.

11. The system of claim 10 wherein the first transceiver only generates the first group of dedicated soft handoff channels without an additional pilot channel.

12. The system of claim 8 including a channel coder, operatively coupled to the first transceiver, that applies spread spectrum coding and applies scramble coding to generate at least one channel in the first group of dedicated soft handoff channels.

13. The system of claim 12 wherein the second transceiver generates a traffic channel for a hard off by maintaining a constant scrambling code and synchronizing a change in spread spectrum coding.

14. The system of claim 8 wherein the first transceiver is part of a soft handoff subsystem in the target base station and the first group of dedicated soft handoff channels are assigned to a specified source base station at a coverage boundary.

15. The system of claim 9 including a controller, operatively coupled to the source base station, that receives the dedicated soft handoff traffic control data and sends, in response to the traffic control data, channel arrival time data for use by the source base station to facilitate at least time synchronization of the dedicated soft handoff channel with a corresponding dedicated soft handoff traffic channel used by the source base station.

16. A system for facilitating a handoff of at least one mobile unit in a telecommunication system having a plurality of base stations providing code division multiple access (CDMA) communication, comprising:

(a) a target base station having:

(i) a soft handoff subsystem comprising:

a first transceiver that generates, over an antenna system, a first group of dedicated soft handoff channels being an orthogonally related subset of a separate second group of spread spectrum coded traffic channels;

a pilot channel receiver operatively coupled to the antenna system, a synchronizing circuit, operatively coupled to the pilot channel receiver and the first transceiver that generates the first group of dedicated soft handoff channels, that provides at least pilot channel arrival time data;

a first soft handoff controller operatively coupled to the synchronizing circuit and to a source base station, that communicates at least pilot channel arrival time data;

(ii) a second transceiver collocated with the first transceiver, that generates the separate second group of spread spectrum traffic channels over a collocated antenna system wherein the second group of spread spectrum traffic channels includes the pilot channel received by the pilot channel receiver; and wherein (b) the source base station includes a second soft handoff controller, operatively coupled to the first soft handoff controller, that generates dedicated soft handoff traffic channel control data for the first transceiver to facilitate selection of a desired dedicated soft handoff channel generated by the target base station.

17. The system of claim 16 wherein the target base station includes a channel coder, operatively coupled to the first transceiver, that applies spread spectrum coding and applies scramble coding to generate at least one channel in the first group of dedicated soft handoff channels.

18. The system of claim 17 wherein the second transceiver generates a traffic channel for a hard handoff by maintaining a constant scrambling code and synchronizing a change in spread spectrum coding.

19. The system of claim 17 wherein first transceiver only generates the first group of dedicated soft handoff channels without an additional pilot channel.

* * * * *